United States Patent [19]

Theilig et al.

[11] Patent Number: 4,558,661
[45] Date of Patent: Dec. 17, 1985

[54] EGG HOLDING FLAT

[75] Inventors: Arthur W. Theilig, Jefferson County; John Poplis, Walworth County, both of Wis.

[73] Assignee: The Marmon Group, Inc., Chicago, Ill.

[21] Appl. No.: 123,692

[22] Filed: Feb. 22, 1980

[51] Int. Cl.$^4$ ............................................. A01K 41/00
[52] U.S. Cl. ........................................................ 119/43
[58] Field of Search ........................................... 119/43

[56] References Cited

U.S. PATENT DOCUMENTS 3,147,737  9/1964  Theilig ..................................... 119/35
3,817,215  6/1974  Levin ........................................ 119/43
3,958,711  5/1976  Morris et al. ......................... 119/43 X
4,004,552  1/1977  Levin ........................................ 119/43

Primary Examiner—Hugh R. Chamblee
Attorney, Agent, or Firm—Kokjer, Kircher, Bradley, Wharton, Bowman & Johnson

[57] ABSTRACT

A multiple cell flat molded from lightweight plastic. The cells are defined primarily by sinuous partition walls that are arranged to define an individual cell shape in the form of two opposed ogee arches connected at the wide ends of the arches. Short lateral support ears are located in the cells and support the eggs with the egg surfaces spaced from the cell walls. The flats can be stacked or nested, and have special shapes at the ends for identification and end to end nesting when the stacks are used in the incubator.

6 Claims, 5 Drawing Figures

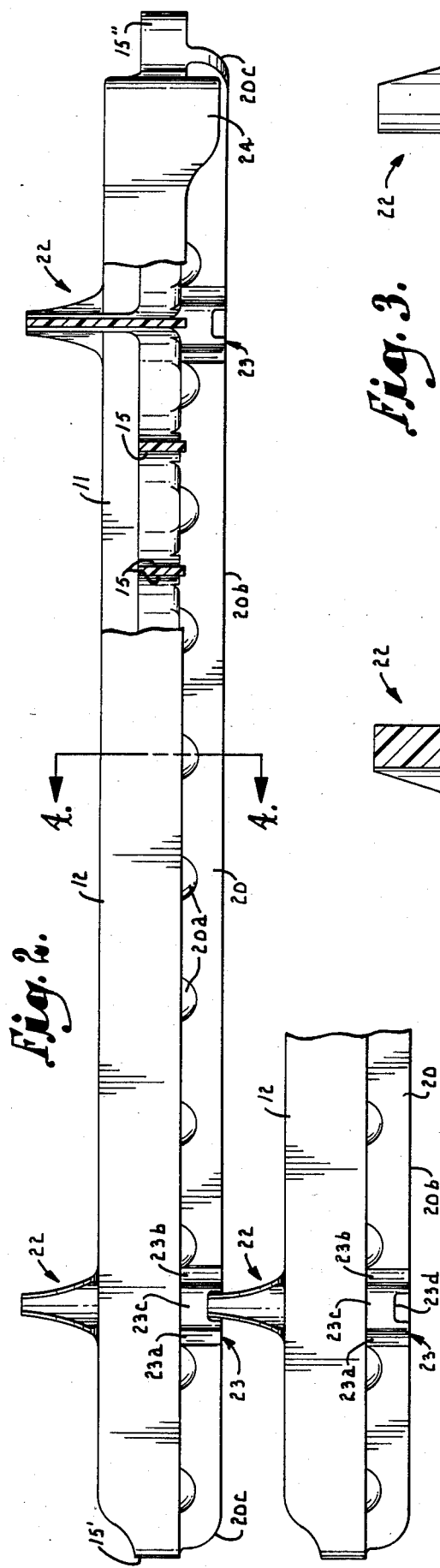
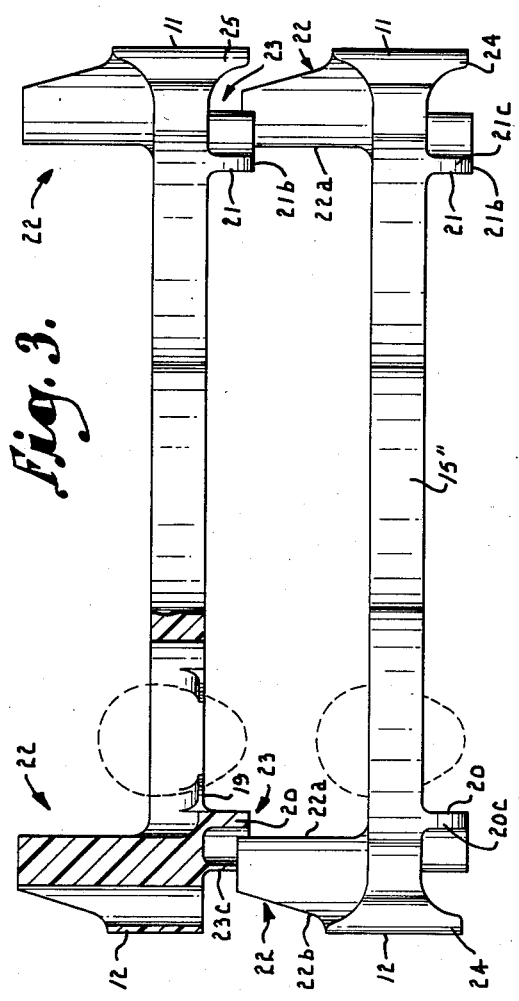
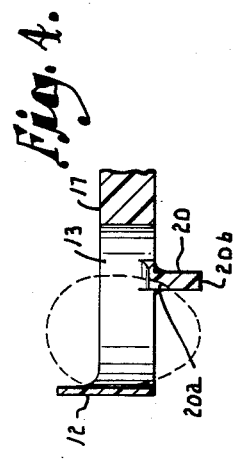

EGG HOLDING FLAT

BACKGROUND AND SUMMARY OF THE INVENTION

In the processing of poultry eggs from laying of the eggs through incubation and hatching, the steps of collection and transport and the mode of holding the eggs during the incubation and hatching stages are critical to the efficiency of the overall operation.

The procedure in use today, one that has been practiced for several years, is to provide at the production facility egg holding trays, commonly also known as egg flats, into which the eggs are placed as they are collected. Egg flats in use today typically are in the form of molded plastic trays having a pattern of cells or receptacles each of which is capable of receiving and supporting an egg. Normally the eggs are held in an upright position (long axis vertical) with the small end down.

The flats are used not only as a means for storing and transporting the eggs from the laying house to the hatchery but also as holders of the egg during the incubation and hatching process. The flats are so constructed that air space exists between the walls of the receptacles and the outside surface of the eggs so that properly conditioned air can be circulated through the flat and past the egg surface. As a consequence, a principle key to volume production within a space of defined limits resides in the number for a flat of given dimensions, the greater number that can be placed within an incubator or hatcher of given dimensions. The ratio of number of eggs per unit of square measurement of an egg flat is referred to as egg density.

The primary object of the present invention is to provide an egg flat of a configuration such that appreciably greater egg density per flat is achieved while providing still for effective circulation space around the eggs and while still conserving substantially in the amount of material that is required for construction of the flat.

Another important object of the invention is to provide an egg flat of the character described which also provides egg support surfaces which are effective to maintain the eggs in the tray during the tilting movements to which the flats and trays are subjected during the "turning" of the eggs takes place during incubation period.

Still another object of the invention is to provide an egg flat of the character described that can with ease be inserted in and removed from an incubator or hatcher without danger of "hanging up" at an intermediate point and causing accidental damage to the eggs.

A further object of the invention is to provide an egg flat in which the design configuration of the individual egg receptacles is such that substantially more uniform air flow through egg flats and around the eggs than has been achieved in the past is made possible.

The objectives of the invention as outlined above are achieved in general by providing a uniquely formed and shaped egg flat which can be constructed of lightweight plastic material yet which, because of the configuration of the flat, is capable of many repeated uses over a long period of time without damage to itself or to the eggs and which achieves a much higher egg density than has heretofore been possible.

The receptacles in the flat are formed, in rows running transversely of the flat, by a series of sinuously continuous wall forming partitions which define the side walls of each egg receptacle, the walls for each receptacle being formed as a pair of symmetrical ogee arches joined at their open ends and terminating at the opposite ends at the apices of the respective arches. Adjacent transverse rows are staggered, with the wide part of a receptacle in one row coinciding with the connection between apices of two receptacles in the next row. Specially located tabs or flanges extending inwardly into each receptacle from the bottom of each side wall provide ledges on which the eggs rest. In addition, the flat includes rows of receptacles running along each side of the flat which are constructed to permit use of continuous planar side walls for the flat which facilitate side by side stacking and which are coordinated with support rails for the flat, the upper surfaces of which serve also to provide support for the eggs in the side receptacles.

Additional objects and advantages of the invention together with the features of novelty appurtenant thereto appear in the course of the following description.

DETAILED DESCRIPTION OF THE INVENTION

In the accompanying drawings, which form a part of the specification and are to be read in conjunction therewith and in which like reference numerals indicate like parts in the various views;

FIG. 2 is a side elevational view of same, parts being broken away and parts shown in section for purposes of illustration, one flat being shown in stacked relationship with another flat (shown as a fragment only);

FIG. 3 is a sectional view, taken generally along the line 3—3 of FIG. 1 in the direction of the arrows, of a pair of stacked flats;

FIG. 4 is a fragmentary sectional view taken generally along line 4—4 of FIG. 2 in the direction of the arrows; and FIG. 5 is a fragmentary sectional view taken along line 5—5 of FIG. 1 in the direction of the arrows.

Figure 1:
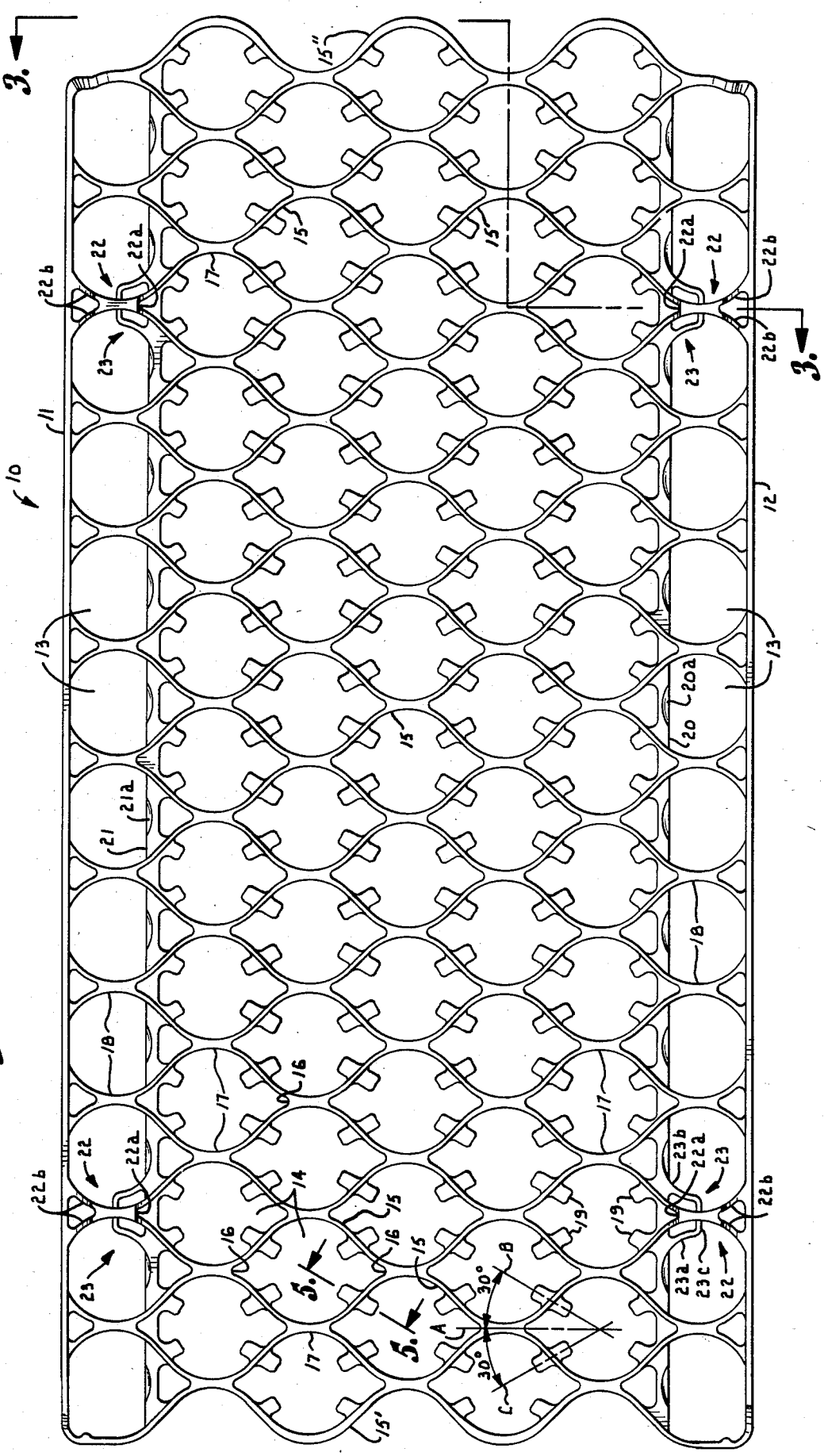
FIG. 1 is a plan view of a preferred egg flat embodying the invention.

Referring now to the drawings, the egg flat 10 is constructed in a general honeycomb pattern bounded at the sides by the parallel longitudinal side walls 11 and 12. Preferably the flat is molded from a suitable plastic, for example, polypropylene, as a one-piece unit.

The flat is generally honeycomb-like in construction, being provided with a plurality of individual cells or receptacles for the eggs. The receptacles are of two kinds. First, there are longitudinal rows of cells identified at 13 bordering and paralleling the side walls 11 and 12. Secondly, there are transverse rows of cells 14 extending crosswise of the flat every row of which is connected at each end with a cell 13.

Cells 13 and 14 are formed by a series of sinuously continuous partition walls 15 extending transversely between side walls 11 and 12 and which are so arranged as to define a shape for each cell which is of a generally oblong configuration. The cells 14 of each transverse row are arranged end to end and each is symmetrical with respect to a common axis extending transversely of the flat. The shape in plan of each cell is in the form of two ogee arches, the apices of which are indicated at 16. The arches are arranged (in effect) with the open ends connecting at the axial midpoint of the cell. The cells 14 of adjacent transverse rows are staggered with respect to one another so that with the exception of the endmost rows (the outside partitions of which are identified at 15' and 15"), each partition 15 serves as a wall for the cells on each side of it.

The cells 14 occupying common rows running longitudinally of the flat have their walls 15 joined as at 17. The cells 13 in the sidemost longitudinal rows are likewise joined one to another in sequence by the connections 18. These connections also serve to connect the cells in sequence in a direction transversely of the flat thus to complete an integrated honeycomb assembly.

Each of the cells 14 is provided with four egg support tabs 19 arranged symmetrically within the cell extending in cantilever fashion inwardly from the base of the partition of the walls defining the cell. The tabs preferably are rounded off on the exposed corners and edges in order to prevent damage to the eggs.

The sidemost cells 13 of the egg flat are shaped somewhat differently than cells 14. The inner half of each conforms to the ogee arch shape earlier described. However, the outer half has a wall surface which is substantially a section of a cylindrical plane (other than in the case of the endmost cells 13', 13") with the wall being interrupted slightly short of what otherwise would be the tangent point by the inside of the flat inside wall 11 or 12, as the case may be. Thus the wall surface of each cell 13 opposite from its ogee arch portion is essentially flat and merges with and forms a continuation of the inside surface of the respective side walls 11 and 12.

The bottom support for the eggs in the sidemost cells 13 is provided by portions of vertical struts or runners, identified respectively at 20 and 21, which run lengthwise of and beneath the honeycomb of the flat near the opposite sides. Each strut is located so that its upper surface intersects the cells 13 approximately midway between each cell center and the apex of the ogee arch. An arcuate notch 20a, 21a is formed in the upper portion of the outfacing surface of the strut at the center of the cell. The notch tapers in depth from the top to bottom and is intended to conform generally with the curvature of the egg, whereby to provide a support for same as illustrated in FIG. 4.

The struts 20, 21 have linearly continuous bottom edges 20b, 21b which facilitate the insertion and removal from and seating of the egg flat on flat supporting surfaces such as provided by shelf or cabinet rails. The ends of the struts are curved as at 20c, 21c.

Each flat is also provided with stacking means which permit the flats to be stacked on top of one another without damage to the eggs. In the illustrated embodiment there are four upwardly extending stacking legs 22 located just inwardly of the four corners of the flat. The legs are integral with and extend upwardly from a connector section 18 between a pair of the sidemost cells 13. Each stacking leg has a vertical inside edge 22a and the opposite downwardly flaring gusset sections 22b connected with the outer edge. The lower portions of the gusset sections are integral with the terminal portions of the cell forming partitions 15 as they approach the side walls 19 and 20.

Located on the underside of the flat and positioned to cooperate with and seat upon the upper ends of the stacking pedestals of a lower flat during stacking of the flats are the seating elements 23. These are located coincidental with the stacking legs and comprise lateral projections to the outside of the integral with the struts 20, 21. Each seating element comprises two spaced vertical wall portions 23a, 23b which are interconnected at their outer ends by a transverse outer wall 23c. The lower edges of the walls 23a, 23b and 23c are in a plane common to the bottom edges of struts 20, 21, and the bottom edges of the outer walls 23c are notched as at 23d. The notches are adapted to fit over the tops of the stacking legs of a lower flat with the base of each notch seating on the top edge of the corresponding stacking leg, as shown in FIGS. 2 and 3.

The flat design is such that when empty, they can be stacked on one another in nested manner. When placing one flat on a lower flat, the upper flat is shifted forward the equivalent of one egg cell. The four stacking legs of the lower flat now are positioned free from interference with the walls 23c and the upper flat can set lower than is the case when the stacking legs are used for stacking.

It will also be noted that the end corners of the flat at the end adjacent the protruding partition walls 15" are constructed so that the depth of side walls 11 and 12 is increased to provide corner tabs 24. The opposite end has no such tabs. There are two reasons for this. First, by providing tabs at one end and no tabs at the other it is possible to easily visually identify the opposite ends of the flat, which is of aid in inserting and removing the flats from the incubating and hatching cabinets. They provide easily available surfaces for contact with the fingers in removing and inserting and otherwise handling the flats; and they also assist in preventing the flat from moving on the tray rack slides (not shown) during turning.

The typical dimensions for a preferred flat are 23½ inches by 11½ inches with the flat containing 84 egg cells. The central cells 14 preferably have an inside dimension measured in the lengthwise direction of the flat of about 1¾ inches and from apex to apex of 2½ inches. The length of the egg support flanges is about ¼ inch measured from the inside cell wall surface. The angle between the transverse axis typified at A in FIG. 1 of one row and an axis from the center of one cell to that of one in an adjacent cell typified at B and C is about 30°. Utilizing this approach, we have achieved an egg density of 0.31 eggs per square inch, all in one plane, which to our knowledge is considerably higher than the density of any other egg flat.

It will also be observed that the end configurations to the flat provided by the partition walls 15' and 15" respectively are such that the flats can be placed in an end to end relationship with the cells of one flat forming an unbroken continuation of the cells of the other. The cells at end 15" are staggered with respect to those at end 15' so that a full nesting takes place with the flats placed end to end and the side walls 11 and 12 of the respective flats in longitudinal alignment. This makes possible the accommodation of 168 eggs in a space that heretofore has held a maximum of 144 eggs, which represents almost a 17 percent increase.

The special configuration of cells 14 assures that substantial quantitites of air can at all times contact the egg surfaces during all phases of handling. With respect to the cells 13, while the support is somewhat different, nevertheless, as shown in FIG. 4, the points of contact with the eggs are limited and space is provided for flow around the eggs in these cells also. The egg is supported at one side in the support notch 20a, 21a and makes point contact with the inside surface of the side wall 11 or 12 at the other side, thus leaving ample flow space around the eggs. At the same time the eggs are protected against displacement during the tilting of the flats which occurs during the hatching and incubation operation.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus descibed our invention we claim:

1. An egg flat for receiving and supporting a plurality of eggs, said flat having
   spaced parallel side walls,
   a plurality of sinuous partition walls extending between said side walls and defining a plurality of transverse rows of egg receptacles arranged in honeycomb fashion with each receptacle being formed with walls in the shape of a pair of ogee arches joined at their open ends with the arches on a common axis and the apices thereof extending in opposite directions,
   the receptacles in adjacent rows being longitudinally staggered relative to one another by about one-half the length of a receptacle, and
   egg support fingers extending from said partition walls inwardly at the bottom of each receptacle for engaging and supporting an egg within the receptacle with the exterior of the eggs spaced from the receptacle walls, and
   support means located on the underside of the flat for supporting same on a rest surface with the bottoms of the receptacles spaced above the rest surface.

2. An egg flat as in claim 1,
   the endmost rows at the opposite ends of the flat having the cells thereof offset longitudinally with respect to one another, the exterior walls at opposite ends of the flat being complementary so that one flat has a close nesting interfit with the other when the flats are placed end to end.

3. An egg flat as in claim 2,
   One of the endmost rows at the opposite ends of the flat having a length less than the overall width of the flat.

4. An egg flat as in claim 1,
   said transverse rows arranged in alternating three cell and four cell rows,
   the end cells of the four cells rows having only one ogee arch, the opposite side of each end cell formed by wall portions which merge with a vertical side wall defining the lateral sidewise limits of the flat.

5. An egg flat as in claim 4,
   said support means comprising parallel support ribs running lengthwise of the flat and located respectively beneath the arch portion of each of the end cells of the four cells rows,
   said support ribs having surfaces which operate to provide support for eggs located in said end cells.

6. An egg flat as in claim 5,
   a plurality of upstanding stacking legs extending upwardly from the flat, and
   a plurality of stacking rest members integral with said support ribs and corresponding in location with the upper ends of said stacking legs, said rest portions adapted to seat upon the stacking legs of another flat when a plurality of said flats are stacked.

* * * * *